United States Patent [19]

Nagahara et al.

[11] Patent Number: 5,708,207
[45] Date of Patent: Jan. 13, 1998

[54] SEMICONDUCTOR ACCELERATION SENSOR

[75] Inventors: Teruaki Nagahara; Masahiro Yamamoto, both of Itami, Japan

[73] Assignee: Mitsubishi Denki Kabushiki Kaisha, Tokyo, Japan

[21] Appl. No.: 695,879

[22] Filed: Aug. 12, 1996

Related U.S. Application Data

[63] Continuation of Ser. No. 512,633, Aug. 8, 1995, abandoned.

[30] Foreign Application Priority Data

Feb. 7, 1995 [JP] Japan ............................ 7-019508

[51] Int. Cl.⁶ ............................................. G01P 15/09
[52] U.S. Cl. ............................... 73/514.34; 73/514.34
[58] Field of Search ......................... 73/514.33, 514.16, 73/514.34, DIG. 4, 719, 720, 721; 338/2, 13, 28, 43; 324/691, 71.1

[56] References Cited

U.S. PATENT DOCUMENTS

| | | | |
|---|---|---|---|
| 3,304,787 | 2/1967 | Chiku et al. | 73/514.33 |
| 3,693,425 | 9/1972 | Starita et al. | 73/514.33 |
| 4,430,895 | 2/1984 | Colton | 73/514.33 |
| 4,522,072 | 6/1985 | Sulouff et al. | 73/514.33 |
| 5,060,504 | 10/1991 | White et al. | 73/514.33 |
| 5,065,628 | 11/1991 | Benecke | 73/514.33 |
| 5,239,870 | 8/1993 | Kaneko | 73/514.33 |
| 5,251,485 | 10/1993 | Kondo | 73/514.16 |

*Primary Examiner*—Hezron E. Williams
*Assistant Examiner*—Richard A. Moller
*Attorney, Agent, or Firm*—Leydig, Voit & Mayer, Ltd.

[57] ABSTRACT

A semiconductor acceleration sensor for detecting accelerations applied in two orthogonal directions includes a semiconductor body having a peripheral frame, a central weight disposed within the peripheral frame, and first and second beams extending from and connecting the peripheral frame and the weight. At least four piezoresistors are disposed on each of the first and second beams and are electrically connected in first and second bridge circuits. Each bridge circuit includes two piezoresistors from each of the two beams so that accelerations applied perpendicular and parallel to the semiconductor body can be individually detected with a single semiconductor acceleration sensor.

6 Claims, 7 Drawing Sheets

R1c~R4c : GAUGE RESISTOR

SEMICONDUCTOR ACCELERATION SENSOR

This disclosure is a continuation of patent application Ser. No. 08/512,633, filed Aug. 8, 1995, now abandoned.

FIELD OF THE INVENTION

The present invention relates to a semiconductor acceleration sensor, and more particularly to a semiconductor acceleration sensor for use with ABS, an air bag system, a suspension system, etc. on automobiles.

DESCRIPTION OF THE RELATED ART

FIG. 7 is a perspective view showing a prior art semiconductor acceleration sensor. Referring to FIG. 7, a set of gauge resistors 1a to 1d for converting stresses into an electrical signal based on the piezoresistive effect of semiconductors is disposed on a front surface of an acceleration sensor beam 3, the gauge resistors 1a to 1d being electrically interconnected so as to make up a bridge circuit (not shown). In a part of the acceleration sensor beam 3 on the rear side of the gauge resistors 1a to 1d, a diaphragm 2 is formed by reducing the thickness of the acceleration sensor beam 3 by etching in order to increase sensitivity.

The acceleration sensor beam 3 is supported by a pedestal 4 a post for supporting the acceleration sensor beam 3 in a cantilevered manner, fixed to a base plate 5. The base plate 5 is provided with lead pins 6 for transmitting the electric signal from the acceleration sensor beam 3 to the exterior, and the lead pins 6 are connected to wires 7 electrically connected to the acceleration sensor beam 3. Though not shown, a cap covering the acceleration sensor beam 3 and so on is attached to the base plate 5.

In the prior art semiconductor acceleration sensor having this structure, when the sensor is subject to an acceleration applied in a direction perpendicular to the surface of the base plate 5 in FIG. 7, the acceleration sensor beam 3 flexes depending on the magnitude of the applied acceleration. Respective resistance values of the gauge resistors 1a to 1d are changed with flexure of the acceleration sensor beam 3, and the magnitude of the acceleration can be detected based on changes in voltage of the bridge circuit.

However, such a semiconductor acceleration sensor can only detect an acceleration applied in the direction perpendicular to the base plate 5. When the semiconductor acceleration sensor is applied to a suspension system or the like, it is necessary to mount two or three sensors for detecting accelerations applied in two or three direction. This results in a problem of increasing the number of parts.

SUMMARY OF THE INVENTION

With a view of solving the problem mentioned above, an object of the present invention is to provide a semiconductor acceleration sensor which can detect accelerations applied in directions orthogonal to each other.

To achieve the above object, the present invention provides a semiconductor acceleration sensor comprising a weight; first and second acceleration sensor beams supporting the weight at its opposite sides therebetween; a support frame for supporting the first and second acceleration sensor beams; diaphragms formed by thinning the first and second acceleration sensor beams from one side; gauge resistors four of which are formed on the first acceleration sensor beam in its area near the weight or the support frame in opposite relation to one of the diaphragms, and two of which are formed on the second acceleration sensor beam in each of its areas near the weight and the support frame in opposite relation to the other of the diaphragms; two sets of bridge circuits formed by combining the gauge resistors and interconnected so as to detect an acceleration applied in a direction vertical to the plane defined by the weight and the first and second acceleration sensor beams and an acceleration applied in a direction including the first and second acceleration sensor beams; a base plate to which the support frame is fixed; and electrical Connection means for transmitting electric signals from the first and second acceleration sensor beams to the exterior.

DETAILED DESCRIPTION OF PREFERRED EMBODIMENTS

Embodiment 1

Figure 1A:
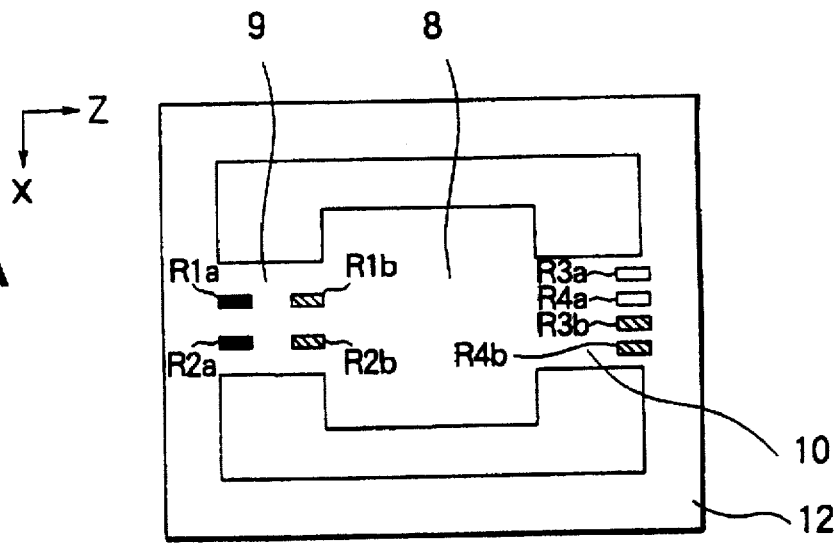
FIGS. 1A and 1B are respectively a plan view and a side sectional view of a principal part of a semiconductor acceleration sensor according to Embodiment 1 of the present invention.
Figure 1B:
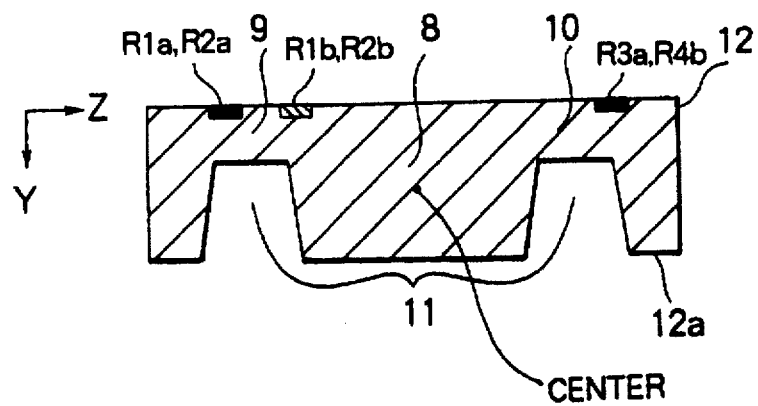
Figure 2A:
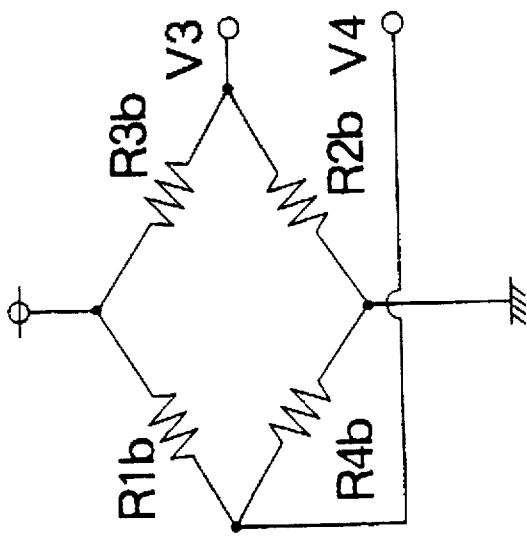
FIGS. 2A and 2B are circuit diagrams of gauge resistors in the semiconductor acceleration sensor according to Embodiment 1 of the present invention.
Figure 2B:
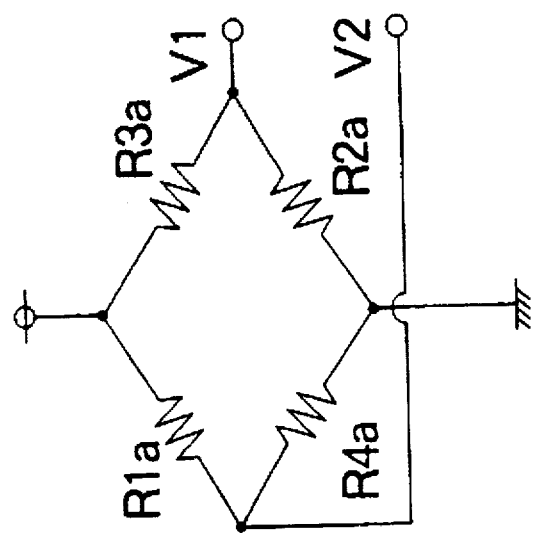

FIG. 1A is a plan view of a principal part of a semiconductor acceleration sensor according to Embodiment 1 of the present invention, and FIG. 1B is a side sectional view of the principal part. Note that, in the attached drawings, the same reference numerals denote the same or corresponding parts. Referring to FIGS. 1A and 1B, first and second acceleration sensor beams 9, 10 are thinned from the rear side to form diaphragms 11 and are supported at opposite ends by a support frame 12 with a weight 8 supported at the center therebetween. Gauge resistors R1a, R2a, R1b, R2b for converting stresses into an electric signal based on the piezoresistive effect of semiconductors are disposed on a front surface of the acceleration sensor beam 9 parallel to each other in a rectangular array, and gauge resistors R3a, R4a, R3b, R4b are disposed on a front surface of the acceleration sensor beam 10 parallel to each other in a linear array and parallel to the gauge resistors R1a, R2a, R1b, and R2b. The gauge resistors R1a, R2a, R3a, R4a are interconnected so as to make up a bridge circuit 1 shown in FIG. 2A, and the gauge resistors R1b, R2b, R3b, R4b are interconnected so as to make up a bridge circuit 2 shown in FIG. 2B.

The support frame 12 is fixed to a base plate (not shown) through a support portion 12a. To avoid the weight 8 from contacting the base plate, the base plate may be recessed, or the weight 8 may be reduced in its height.

In the semiconductor acceleration sensor having this structure, the eight gauge resistors all lie, i.e., are parallel, along in the same direction a crystal axis, such that the resistance value of each gauge resistor is increased when subjected to tension and is reduced when subjected to compression.

Figure 3B:
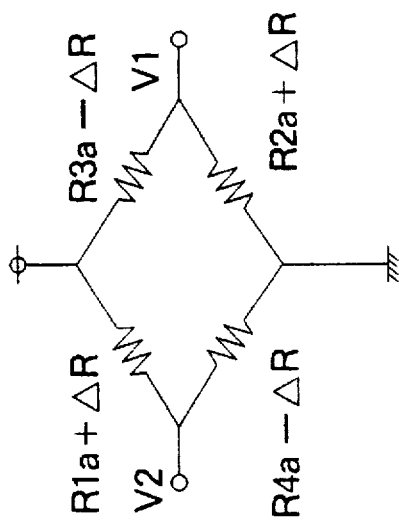
FIGS. 3A to 3D are side sectional views of the principal part and circuit diagrams of gauge resistors for explaining operation of the semiconductor acceleration sensor according to Embodiment 1 of the present invention.
Figure 3D:
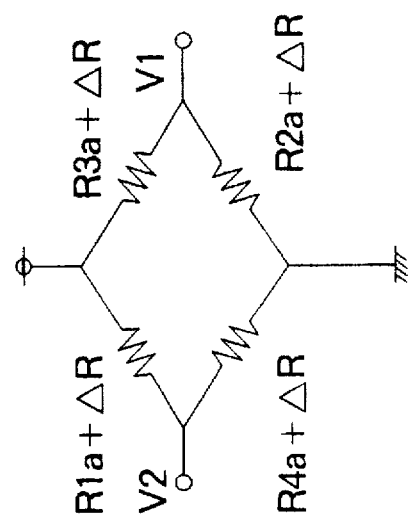
Figure 3A:
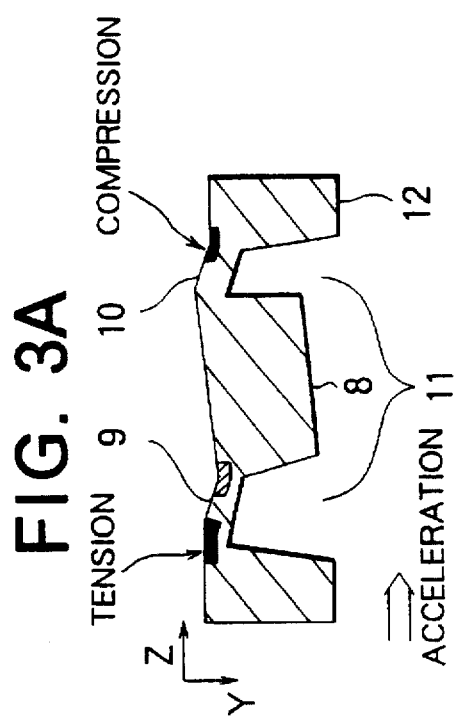

When the gauge resistors R1a to R4b are arranged on the acceleration sensor beams 9, 10 as shown in FIG. 1 and the semiconductor acceleration sensor is subject to an acceleration applied in the direction Z, the height of the acceleration sensor beams 9, 10 supporting the weight 8 is relatively displaced with respect to the center of gravity of the weight 8, causing the weight 8 to move as shown in FIG. 3A. Therefore, the gauge resistors R1a, R2a undergo tension and increase their resistance values by $\Delta R$ and, conversely, the gauge resistors R3a, R4a undergo compression and reduce their resistance values by $\Delta R$. As a result, as shown in FIG. 3B, a potential difference corresponding to the applied acceleration is produced between output terminals $V_1$ and $V_2$ of the bridge circuit 1.

Figure 3C:
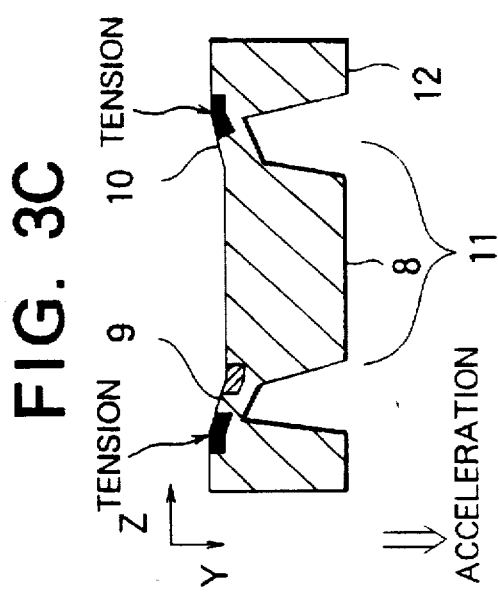

On the other hand, when the semiconductor acceleration sensor is subjected to an acceleration applied in the direction Y, all the gauge resistors R1a to R4a undergo tension and increase their resistance values by $\Delta R$ and, therefore, no potential difference is produced between output terminals $V_1$ and $V_2$ of the bridge circuit 1 (FIGS. 3C and 3D). Consequently, the bridge circuit 1 is eventually not sensitive to an acceleration applied in a direction (i.e., the direction Y) than intended.

Figure 4B:
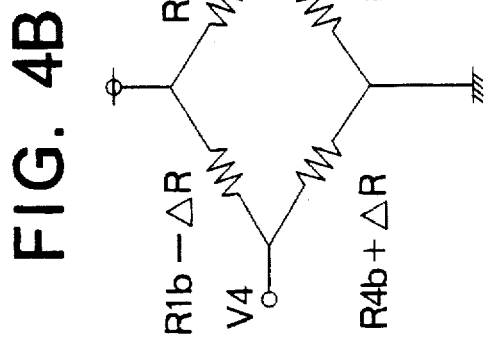
FIGS. 4A to 4D are side sectional views of the principal part and circuit diagrams of the gauge resistors for explaining operation of the semiconductor acceleration sensor according to Embodiment 1 of the present invention.

Operation of the bridge circuit comprising the gauge resistors R1b to R4b will now be described. When the semiconductor acceleration sensor is subject to an acceleration applied in the direction Y, the gauge resistors R1b, R2b undergo compression and reduce their resistance values by $\Delta R$ and, conversely, the gauge resistors R3b, R4b undergo tension and increase their resistance values by $\Delta R$ (FIGS. 4A and 4B). As a result, a potential difference is produced between output terminals $V_3$ and $V_4$ of the bridge circuit 2, making it possible to detect the acceleration applied in the direction Y.

Figure 4D:
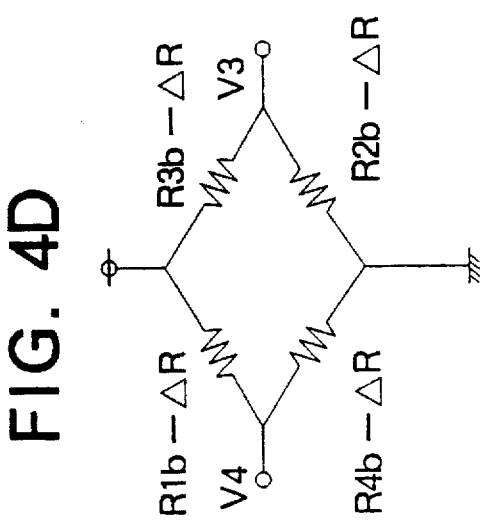
Figure 4A:
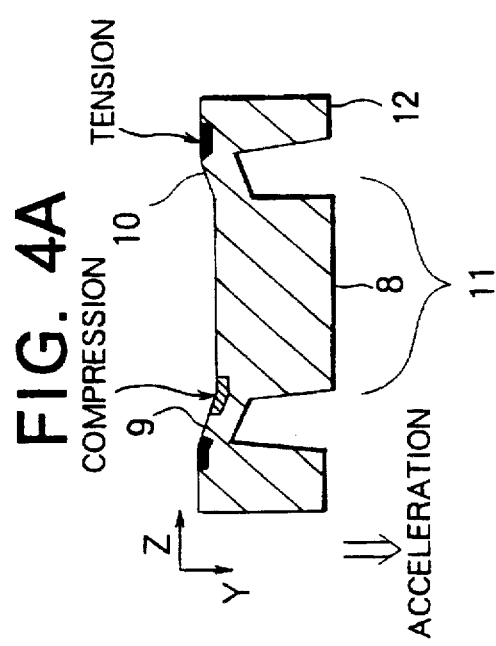
Figure 4C:
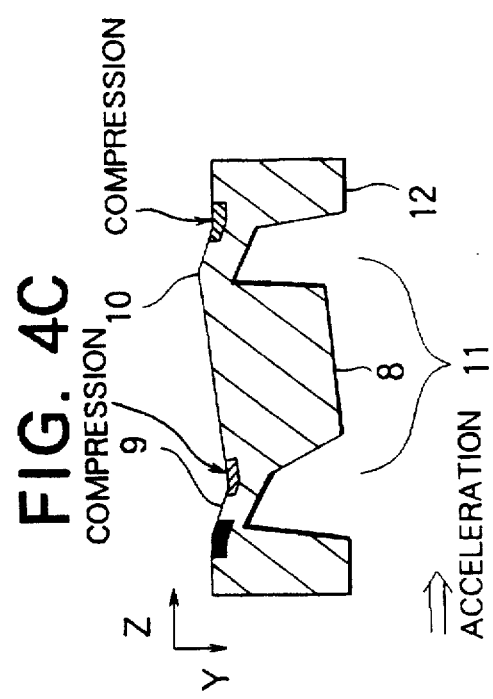

On the other hand, when the semiconductor acceleration sensor is subject to an acceleration applied in the direction Z, all the gauge resistors R1b to R4b undergo compression and reduce their resistance values by $\Delta R$ and the bridge circuit 2 is eventually not sensitive to the acceleration applied in the direction Z (FIGS. 4C and 4D).

Consequently, accelerations applied in the two directions Y and Z can be detected by using the eight gauge resistors.

Embodiment 2

Figure 5:
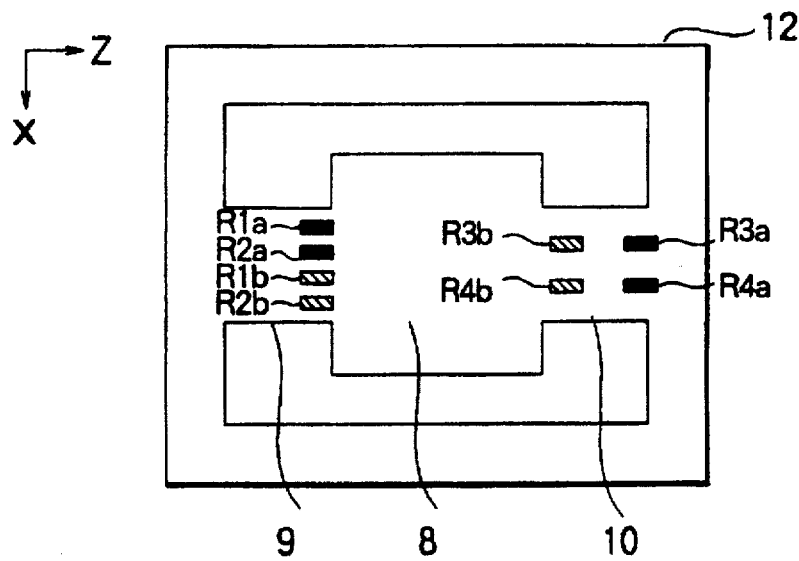
FIG. 5 is a plan view of a principal part of a semiconductor acceleration sensor according to Embodiment 2 of the present invention.

The gauge resistors R3a, R4a, R3b, R4b in Embodiment 1 are arranged on the acceleration sensor beam 10 in its area near the support frame 12. But, as shown in FIG. 5, the gauge resistors R1a, R2a, R1b, R2b may be arranged in a linear array on the acceleration sensor beam 9 in its area near the weight 8 with the same effect as in Embodiment 1. The gauge resistors R3b, R3b, R4a, and R4b are arranged in a rectangular array on the front surface 10. The bridge circuit 1 made up by the gauge resistors R1a to R4a serves to detect an acceleration applied in the direction Y, whereas the bridge circuit 2 made up by the gauge resistors R1b to R4b serves to detect an acceleration applied in the direction Z.

Embodiment 3

Figure 6A:
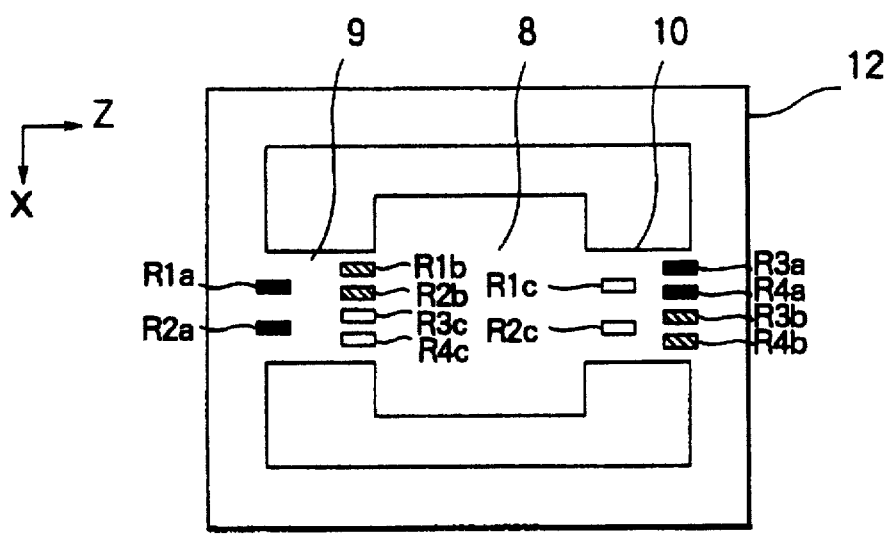
FIGS. 6A and 6B are respectively a side sectional view of a principal part and a circuit diagram of gauge resistors in a semiconductor acceleration sensor according to Embodiment 3 of the present invention.
Figure 6B:
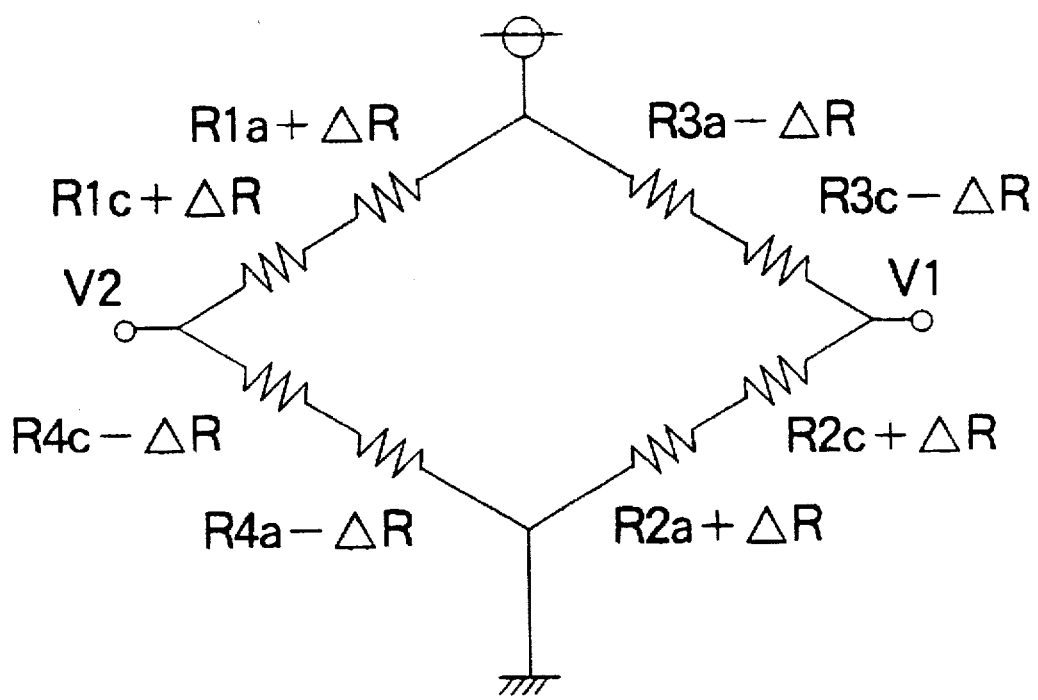
Figure 7:
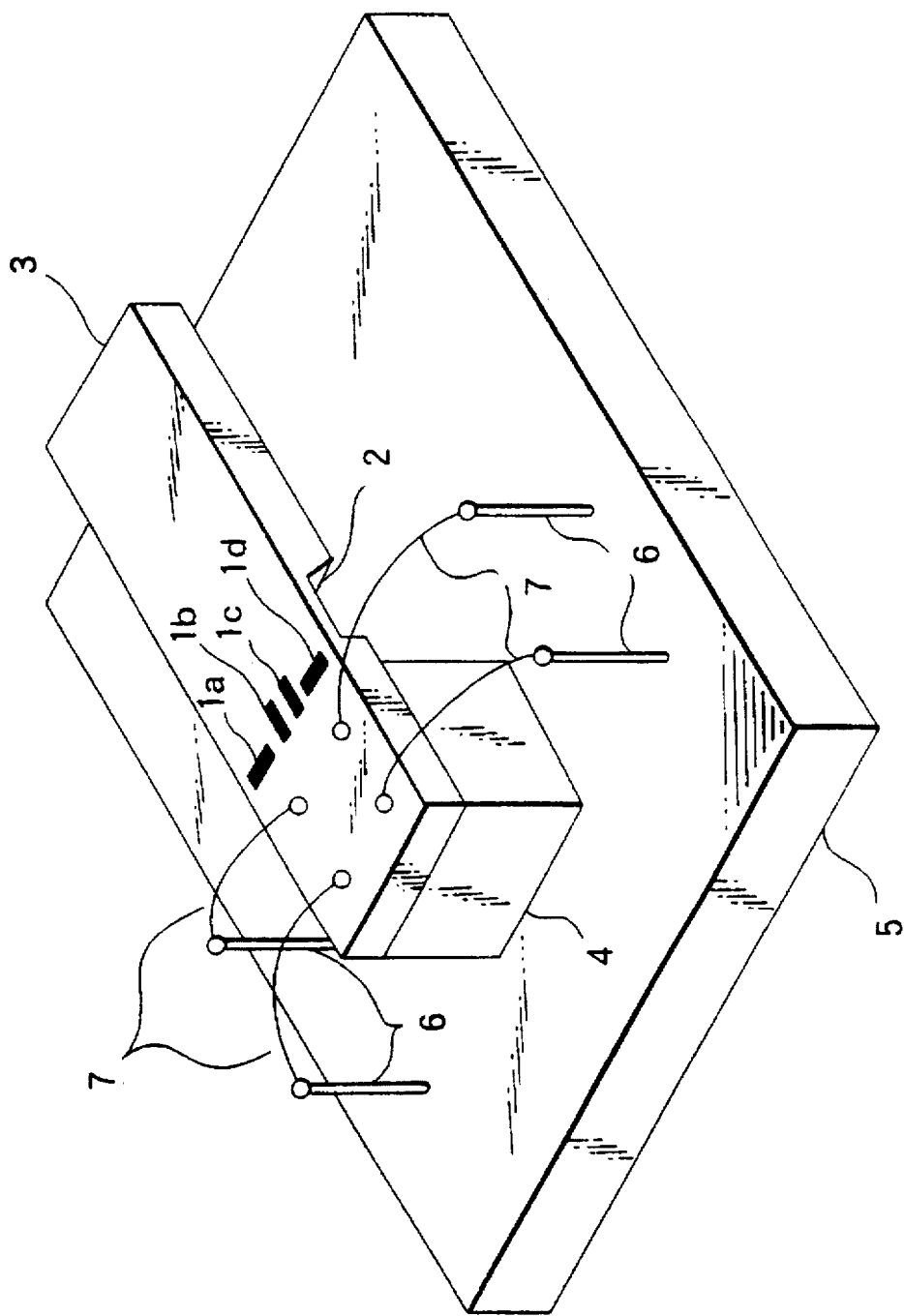
FIG. 7 is a perspective view showing a prior art semiconductor acceleration sensor.

The semiconductor acceleration sensor of Embodiment 1 has lower sensitivity for an acceleration applied in the direction Z than for an acceleration applied in the direction Y because of its specific structure. In this Embodiment 3, therefore, the gauge resistors R1c to R4c are ranged as shown in FIG. 6A, i.e., all in parallel to each other and eight of those gauge resistors R1a, R1c, R2a, R2c, R3a, R3c, R4a, and R4c are interconnected to make up a bridge circuit 3 as shown in FIG. 6B.

By so providing two sets of gauge resistors for the direction Z, it is possible to double the sensor's sensitivity for an acceleration applied in the direction Z.

While two sets of gauge resistors for detecting an acceleration applied in the direction Z are disposed acceleration sensor beams 9 and 10 to increase the sensitivity in the direction Z, three or more sets of gauge resistors may be disposed if necessary.

What is claimed is:

1. A semiconductor acceleration sensor comprising:
   a semiconductor body including:
      a peripheral frame;
      a central weight disposed within the peripheral frame; and
      first and second diametrically opposite beams extending from and connecting the peripheral frame and the weight, the first and second beams being thinner than the peripheral frame and the weight, the peripheral frame, the first and second beams, and the weight having respective front surfaces that are all coplanar;
   first, second, third, and fourth piezoresistors disposed on the front surface of the first beams; and
   fifth, sixth, seventh, and eighth piezoresistors disposed on the front surface of the second beam wherein the first, second, third, fourth, fifth, sixth, seventh, and eighth piezoresistors are all parallel to each other and the first, second, fifth, and sixth piezoresistors are electrically connected in a first bridge circuit and the third, fourth, seventh, and eighth piezoresistors are electrically connected in a second bridge circuit whereby accelerations applied to the semiconductor body parallel to the front surface of the weight and perpendicular to the front surface of the weight can be individually detected through the first and second bridge circuits, respectively.

2. The semiconductor acceleration sensor of claim 1 wherein the first, second, third, and fourth piezoresistors are arranged on the first beam in a rectangular array and the fifth, sixth, seventh, and eighth piezoresistors are arranged on the second beam in a linear array.

3. The semiconductor acceleration sensor of claim 1 wherein the fifth, sixth, seventh, and eighth piezoresistors are located adjacent the peripheral frame and spaced from the weight.

4. The semiconductor acceleration sensor of claim 1 wherein the first, second, third, and fourth piezoresistors are arranged on the first beam in a linear array and the fifth, sixth, seventh, and eighth piezoresistors are arranged on the second beam in a rectangular array.

5. The semiconductor acceleration sensor of claim 1 wherein the first, second, third, and fourth piezoresistors are located adjacent the weight and spaced from the peripheral frame.

6. The semiconductor acceleration sensor of claim 1 including ninth and tenth piezoresistors disposed on the first beam and eleventh and twelfth piezoresistors disposed on the second beam wherein the ninth, tenth, eleventh, and twelfth piezoresistors are respectively connected in series with the fifth, sixth, first, and second piezoresistors in the first bridge circuit whereby sensitivity to detected acceleration is increased.

* * * * *